United States Patent [19]

Maeda et al.

[11] Patent Number: 5,661,567
[45] Date of Patent: Aug. 26, 1997

[54] COMPLEX RECORDING APPARATUS HAVING ANALOG COPYING FUNCTION AND A DIGITAL FACSIMILE FUNCTION

[75] Inventors: Yukiya Maeda; Shuuji Watanabe; Koji Tokura; Naoyuki Kikuchi; Shigeru Tanabe, all of Gifu, Japan

[73] Assignee: Sanyo Electric., Ltd., Osaka, Japan

[21] Appl. No.: 307,879

[22] Filed: Sep. 16, 1994

[30] Foreign Application Priority Data

Sep. 21, 1993 [JP] Japan ................. 5-234454
Sep. 22, 1993 [JP] Japan ................. 5-236352
Sep. 22, 1993 [JP] Japan ................. 5-236353

[51] Int. Cl.⁶ .......................... H04N 1/00; G03B 27/62
[52] U.S. Cl. .......................... 358/400; 358/401; 358/408; 358/496; 358/498; 399/361; 399/380
[58] Field of Search ............... 358/498, 408, 358/400, 474, 401, 496, 497; 271/3.01, 9.09; 355/202, 311, 308, 75; 399/361, 369, 380, 391; H04N 1/00; G03B 27/62

[56] References Cited

U.S. PATENT DOCUMENTS 4,794,419 12/1988 Shibazaki et al. .................. 355/32
5,452,097 9/1995 Koga et al. ....................... 358/342

FOREIGN PATENT DOCUMENTS 111480 7/1983 Japan .................. 358/408
1165 1/1986 Japan .................. 358/408

*Primary Examiner*—Thomas L. Stoll
*Attorney, Agent, or Firm*—Darby & Darby

[57] ABSTRACT

A complex recording apparatus includes a housing. A platen glass is provided at an upper portion of the housing, and an exposure lamp which reads a first original put on the platen glass is provided within the housing. Furthermore, above the housing, a platen cover which holds the first original put on the platen glass and a reading head which reads a second original supplied from an outside are independently provided.

9 Claims, 8 Drawing Sheets

F I G. 5
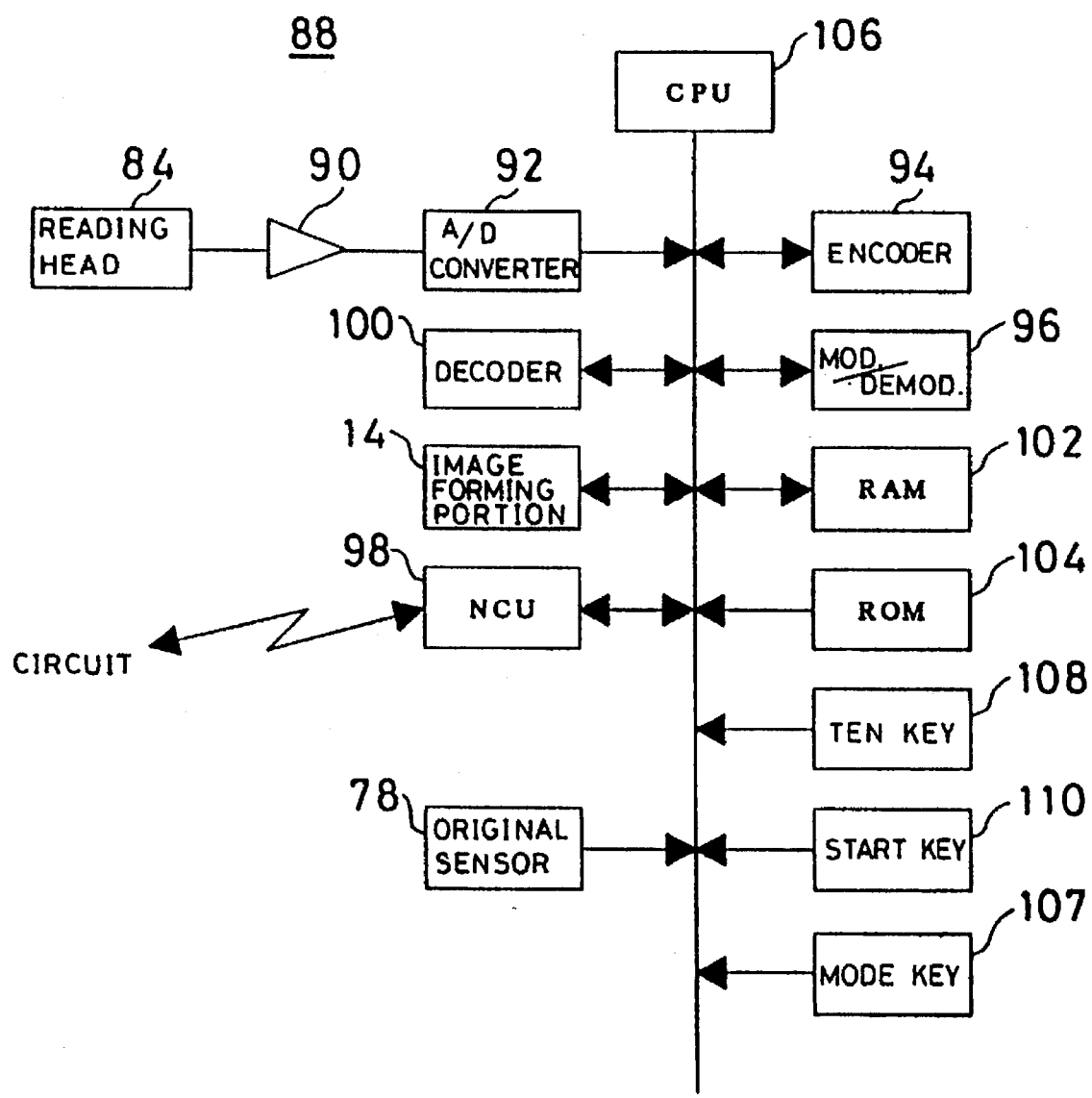

COMPLEX RECORDING APPARATUS HAVING ANALOG COPYING FUNCTION AND A DIGITAL FACSIMILE FUNCTION

BACKGROUND OF THE INVENTION

1. Field of the Invention

The present invention generally relates to a complex recording apparatus. More specifically, the present invention relates to a complex recording apparatus which has both of an analog copy machine function and a digital facsimile machine function.

2. Description of the Prior Art

In a conventional such a kind of complex recording apparatus, in general, a facsimile original reading portion is provided on a side surface of an apparatus body or on a platen cover which holds an original for an analog copy. Therefore, in the prior art, there was a problem that an apparatus becomes large, and thus, it is impossible to make the apparatus compact and lightweight.

SUMMARY OF THE INVENTION

Therefore, a principal object of the present invention is to provide a novel complex recording apparatus.

Another object of the present invention is to provide a complex recording apparatus capable of being made compact and lightweight.

A complex recording apparatus according to the present invention comprises: a housing; a platen glass provided at an upper portion of the housing; first original reading means which reads a first original put on the platen glass; a platen cover which holds the first original; and a second original reading means which is provided above the housing independently of the platen cover and reads a second original supplied from an outside.

Since the second original reading means is provided above the housing independently of the platen cover, in comparison with a case where the second original reading means is provided on a side surface of an apparatus body or on the platen cover, it is possible to make the apparatus compact and lightweight. Furthermore, in comparison with a case where the second original reading means is provided on the platen cover, it is possible to improve an operability for opening or closing the platen cover.

More specifically, the platen cover includes a guide means which guides the second original to the second original reading means, and the housing includes an upper housing portion and a lower housing portion which are coupled to each other in a manner that the same can be divided in an upper direction and a lower direction, respectively. Therefore, it is unnecessary to additionally provide with a paper feeding table or the like. Furthermore, even if the upper housing portion and the lower housing portion are separated when a paper jam is to be released, a positional relationship between the platen cover and the second original reading means is not changed, and therefore, there are no problem that the second original set in the guide means is divided in portions.

In another aspect of the present invention, an electric circuit board is arranged below the second original reading means, and an operation panel is arranged at a front portion of the housing and below an upper surface of the platen glass. Therefore, it is possible to make an electric wiring associated with the second original reading means and the electronic circuit board short and simple, and it is possible to prevent the operation panel from being hidden by an original which protrudes forward at the front portion of the housing.

Furthermore, if there is provided with an inhibiting means which inhibits the second original from being guided to the second original reading means when the platen cover is opened, it is possible to prevent the second original from being undesirably supplied to the second original reading means.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a block diagram showing a facsimile transmission/reception circuit;

DETAILED DESCRIPTION OF THE PREFERRED EMBODIMENTS

Figure 1:
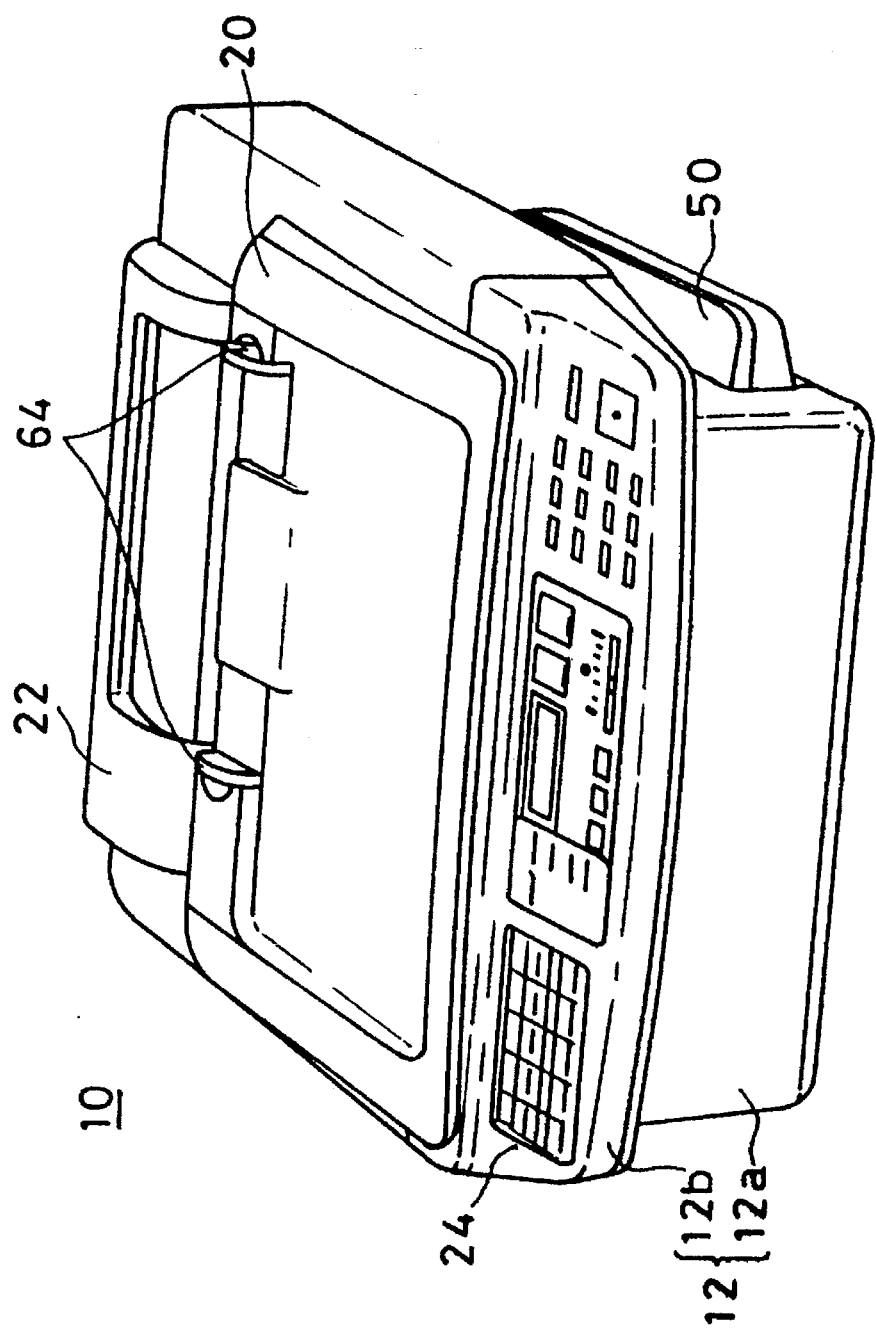
FIG. 1 is a perspective view showing one embodiment according to the present invention.
Figure 2:
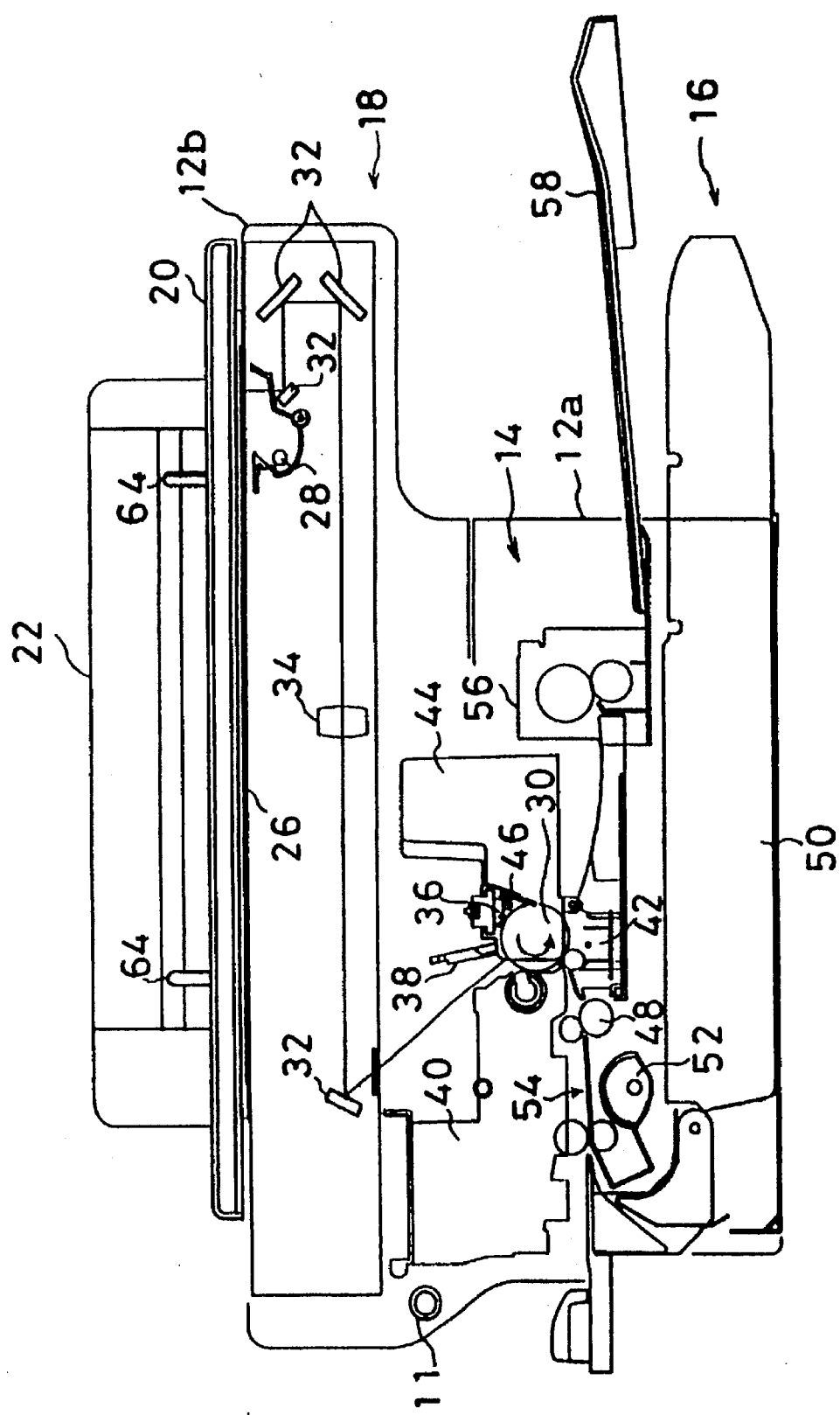
FIG. 2 is an illustrative view showing internal structure of FIG. 1 embodiment.
Figure 3:
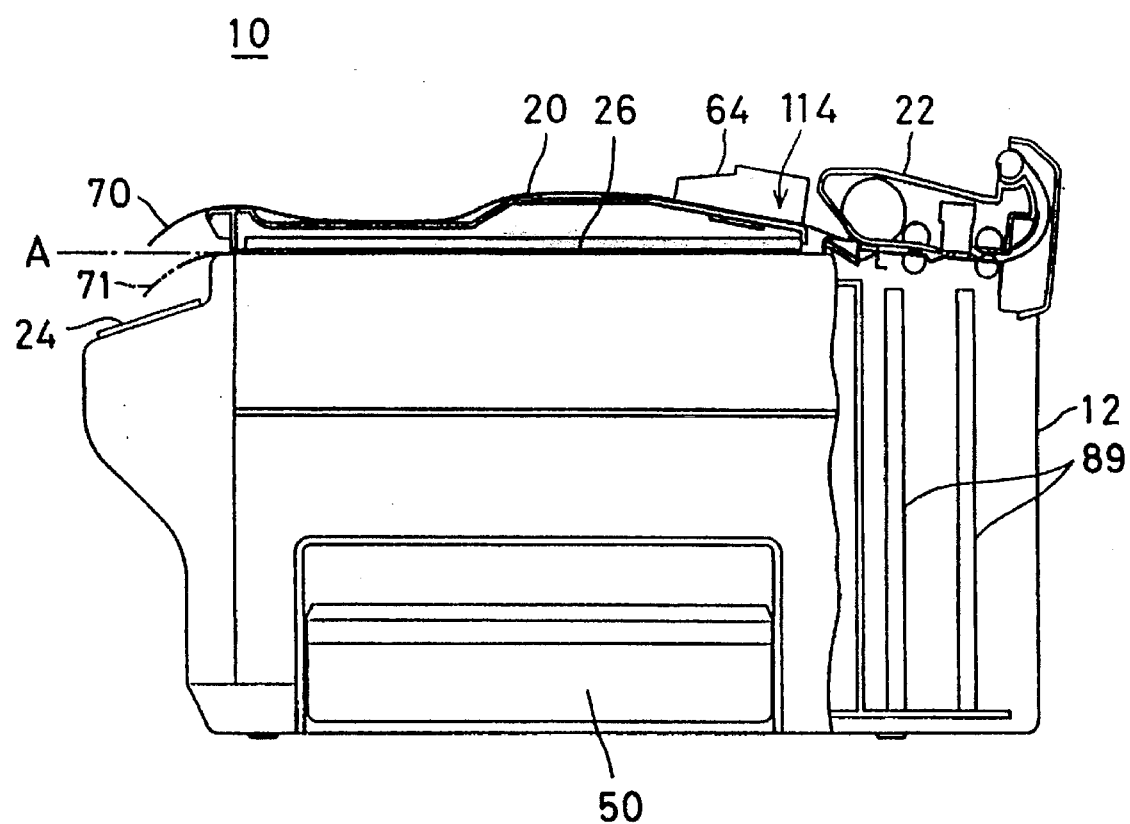
FIG. 3 is a side plan view showing FIG. 1 embodiment.

A complex recording apparatus 10 of this embodiment shown in FIG. 1 to FIG. 3 includes a housing 12 which is of a clam-shell type and divided in an upper direction and a lower direction with a fulcrum of a hinge portion 11 (FIG. 2). There are provided with an image forming portion 14 and a paper supplying portion 16 in a lower housing portion 12a, and in an upper housing portion 12b, there is provided with an analog original reading portion 18. Furthermore, above the analog original reading portion 18, that is, on an upper surface of the upper housing portion 12b, there are provided with a platen cover 20 and a facsimile original reading portion 22 both shown in FIG. 4, an operation panel 24 shown in FIG. 1 and FIG. 3, and etc.

The analog original reading portion 18 (FIG. 2) includes a platen glass 26 arranged at an upper portion of the upper housing portion 12b, and below the platen glass 26, an exposure lamp 28 for exposing an original (not shown) put on the platen glass 28, a plurality of reflection mirrors 32 and a variable power lens 34 for leading a reflection light from the original being exposed by the exposure lamp 28 to a photosensitive member 30 (described later), and etc. are arranged at respective predetermined positions.

The image forming portion 14 (FIG. 2) includes the photosensitive member 30 having a photo-conductive layer (not shown) which is formed on an outer most periphery of the photosensitive member 30. Around the photosensitive member 30, a charger 36 for uniformly charging the photosensitive member 30, a light emitting device array 38 which is driven by image data received by a transmission/reception circuit 88 (FIG. 5: described later), a developer 40 for adhering a toner to an electrostatic latent image formed on an outer surface of the photosensitive member 30, a transfer charger 42 for transferring a toner image from the photosensitive member 30 onto a paper (not shown) supplied to the photosensitive member 30, a cleaning unit 44 for removing a toner remaining on the photosensitive member 30, and an eraser 46 for removing a charge remaining on the photosensitive member 30 are arranged in a rotation direction of the photosensitive member 30 (an arrow mark direction) in this order.

When an original image is irradiated from the reflection mirrors 32 or the light emitting device array 38 onto the photosensitive member 30 being uniformly charged by the charger 36, the electrostatic latent image is formed on the photosensitive member 30 according to a photo-conductive characteristic of the photosensitive member 30. Then, the toner is adhered to the electrostatic latent image by the developer 40, and the toner image is transferred onto the paper (not shown) supplied from a register roller 48 by the transfer charger 42.

The paper supplying portion 16 (FIG. 2) includes a paper supplying tray 50 which is detachably attached to an apparatus body, and papers are accommodated in the paper supplying tray 50. A paper supplying roller 52 is provided above an end portion of the paper supplying tray 50, and a paper stocked in the paper supplying tray 50 is fed by the paper supplying roller 52. The paper fed by the paper supplying roller 52 is supplied to the photosensitive member 30 via a paper supplying path 54 and the register roller 48, and the toner image is transferred onto the paper thus supplied to the photosensitive member 30 by the transfer charger 42. Then, the paper having the transferred toner image is fed to a fixing unit 56, and therefore, the toner image is fixed to the paper, and thereafter, the paper is discharged on a paper discharging tray 58.

The platen cover 20 (FIG. 4) has a function for holding the original put on the platen glass 26 (FIG. 2) and interrupting a disturbance light, and a function for guiding a facsimile original 70 (FIG. 3) to the facsimile original reading portion 22. The platen cover 20 is attached to an upper surface of the upper housing portion 12b via a hinge portion 62 which is provided at a position separated from an edge 60 of the platen cover 20 with a predetermined distance in a manner that the platen cover 20 can be opened or closed. A pair of paper guides 64 are provided on an upper surface of the platen cover 20. The paper guides 64 are supported in a manner that the paper guides 64 can be projected or attracted to or from a center of an entrance 66 of the facsimile original reading portion 22 with keeping the same distance between the center and the paper guides 64. Therefore, by bringing the paper guide 64 into contact with both side ends of the original 70, it is possible to position a center of the original 70 at the center of the entrance 66.

The facsimile original reading portion 22 (FIG. 4) includes a fixed casing 66 which is fixed at the upper portion of the upper housing portion 12b. A plate-like original abutting portion 72 to which the facsimile original 70 (FIG. 3) put on the platen cover 20 abuts at a time that the platen cover 20 is opened is formed at an end portion of the fixed casing 68. There are provided with a separating pad 74, pinch rollers 75a and 75b, and etc., at an upper portion of the fixed casing 68. An upper cover 76 is provided above the fixed casing 68 in a manner that the upper cover 76 can be opened or closed. There are provided with an original sensor 78, a paper supplying roller 80, feeding rollers 82a and 82b, a reading head 84, a discharging roller 86, and etc. on the upper cover 76. In addition, as the reading head 84, a head having an LED array for irradiating a light to the original and a CCD sensor array for receiving a reflection light from the original is utilized.

The operation panel 24 (FIG. 3) is arranged at a front portion of the housing 12 and within a height A of an upper surface of the platen glass 26. Therefore, even if the original 70 or 71 put on the platen cover 20 or the platen glass 26 is slightly projected toward a front direction of the housing 12, the operation panel 24 can not be hidden by the original 70 or 71.

Furthermore, an electric circuit board 89 which holds the transmission/reception circuit 88 for performing a facsimile transmission/reception and etc. is arranged within the housing 12 and below the facsimile original reading portion 22 as shown in FIG. 3. As shown in FIG. 5, the transmission/reception circuit 88 includes an amplifier 90 which amplifies an output of the reading head 84, an A/D converter 92, an encoder circuit 94, a modulation/demodulation circuit 98, an NCU (network control unit) 98, a decoder circuit 100, a RAM 102, a ROM 104, a CPU 106 which controls these components, and etc.

At a time of facsimile transmission, when the original is set in a hopper 112 (FIG. 4) or a mode key 107 is operated, the apparatus is changed into a facsimile mode (facsimile original reading mode). Then, in a case where the apparatus is automatically changed into the facsimile mode by setting the original in the hopper 112, a ten key 108 (may be an abbreviated dialing key) is operated to specify an apparatus to be called, and then, by operating a start key 110, a facsimile transmission is started. On the other hand, in a case where the apparatus is changed into the facsimile mode by operating the mode key 107, by setting the original in the hopper 112, and by specifying an apparatus to be called by means of operation of the ten key 108 (may be an abbreviated dialing key), and by operating the start key 110, a facsimile transmission is started.

Figure 4:
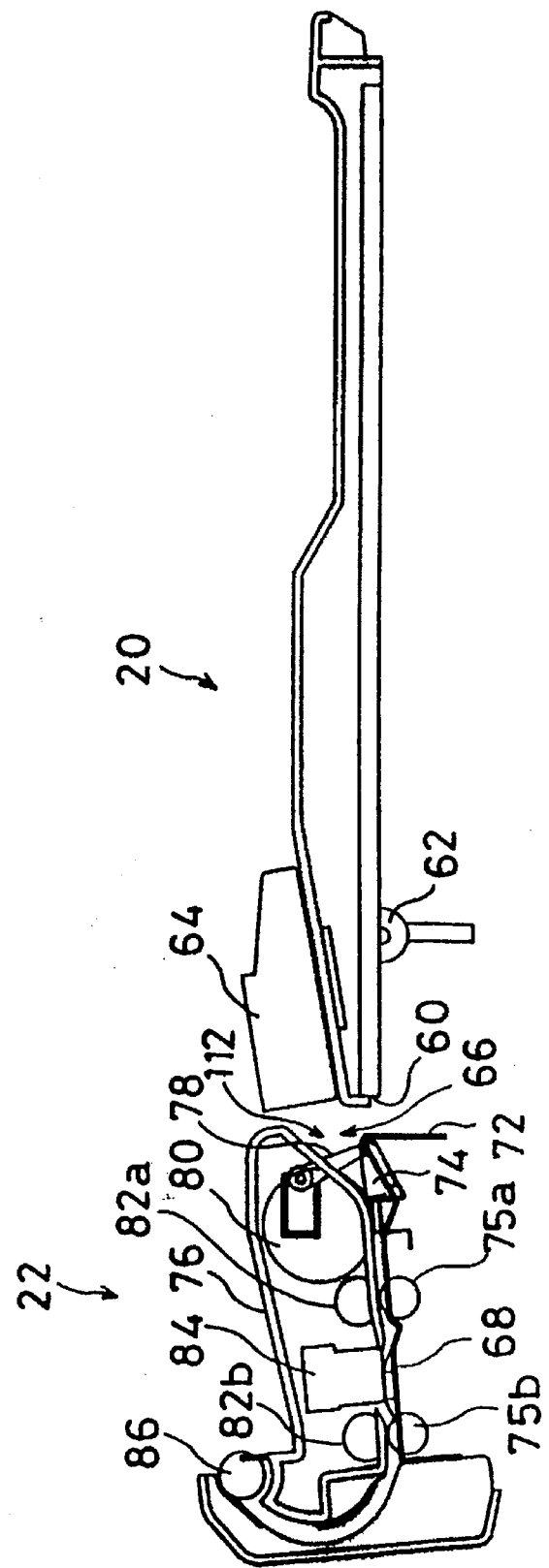
FIG. 4 is an illustrative view showing a platen cover and a facsimile original reading portion.

When the start key 110 is operated, at first, an automatic dialer (not shown) is operated, whereby a circuit between the apparatus and the called apparatus is connected by the NCU 98 in accordance with a predetermined protocol. When the circuit connection is recognized or confirmed, and when the original set in the hopper 112 is detected by the original sensor 78, the paper supplying roller 80, the feeding rollers 82a and 82b, and the discharging roller 86 are driven such that the original is supplied to the reading head 84 from the hopper 112 one by one (FIG. 4). The reading head 84 outputs an image signal corresponding to an original image, and this output is amplified by the amplifier 90 and converted into digital image data by the A/D converter 92, and then, encoded by the encoder circuit 94 to compress a data amount. Then, encoded data from the encoder circuit 94 is modulated to be converted into suitable transmission signal for facsimile communication by the modulation/demodulation circuit 96, and thereafter, outputted to the called apparatus via the NCU 98 and the circuit which has been established. When all the original have been completely read, a predetermined acknowledgment protocol is performed by the NCU 98, and thereafter, if termination is confirmed, the circuit is opened.

When the apparatus is called by another facsimile apparatus, a predetermined protocol is performed by the NCU 98, whereby a circuit between the apparatus and the calling apparatus is established, and then, reception data is inputted to the modulation/demodulation circuit 96 through the circuit and the NCU 98. The reception data is demodulated by the modulation/demodulation circuit 96, and an output of the modulation/demodulation circuit 96, i.e., the encoded signal is decoded by the decoder circuit 100. An output of the decoder circuit 100, i.e., the image data is outputted to the image forming portion 14.

Furthermore, in this embodiment shown, by temporarily storing the facsimile transmission data after modulation in the RAM 102, a function that the facsimile transmission data is read at a plurality of times so as to be sent to a plurality of apparatus different from each other, or the facsimile transmission data is sent to the called apparatus at a designated time can be performed. Furthermore, by temporarily storing the reception data received during a time that the copying operation is performed in the RAM 102, a function that after the completion of the copying operation, the image data based on the reception data stored in the RAM is outputted to the image forming portion 14 can be performed.

In addition, in the ROM 104, a control program for controlling the transmission/reception circuit 88 is stored.

According to the above described embodiment, the facsimile original reading portion 22 is provided on the upper surface of the housing independently of the platen cover 20, and the platen cover 20 is used as a document feeding portion for the facsimile original 70, and therefore, it is possible to make the apparatus compact and lightweight.

Figure 6:
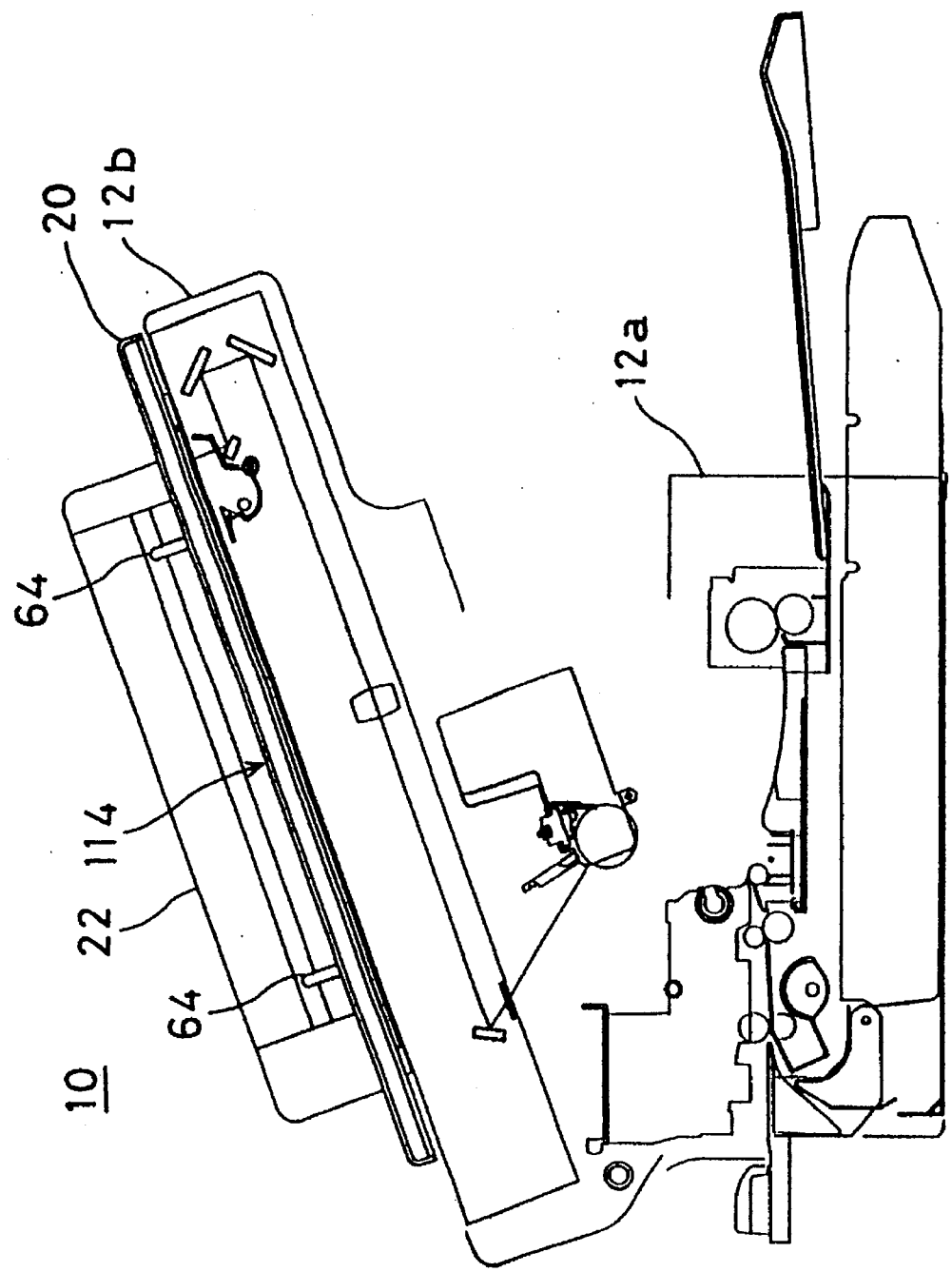
FIG. 6 is an illustrative view showing a state where an upper housing portion and a lower housing portion are separated from each other.

Furthermore, since the both of the platen cover 20 and the facsimile original reading portion 22 are provided at the upper portion of the upper housing portion 12b as shown in FIG. 6, even if the lower housing portion 12a and the upper housing portion 12b are divided or opened, the positional relationship between the platen cover 20 and the facsimile original reading portion 22 is not changed. Therefore, when the housing 12 is divided in a case where the paper jam is to be released, for example, the paper supplying path 114 (FIG. 3, FIG. 6) for the facsimile original 70 is not separated or divided, and therefore, there occurs no problem that the facsimile original 70 existing in the paper supplying path 114 is destroyed.

Furthermore, since the electric circuit board 89 (FIG. 3) for the transmission/reception circuit 88 (FIG. 5) and etc. is arranged within the housing 12 and below the facsimile original reading portion 22, it is possible to make the electric wiring associated with the facsimile original reading portion 22 and the electronic circuit board 89 short and simple.

Figure 7:
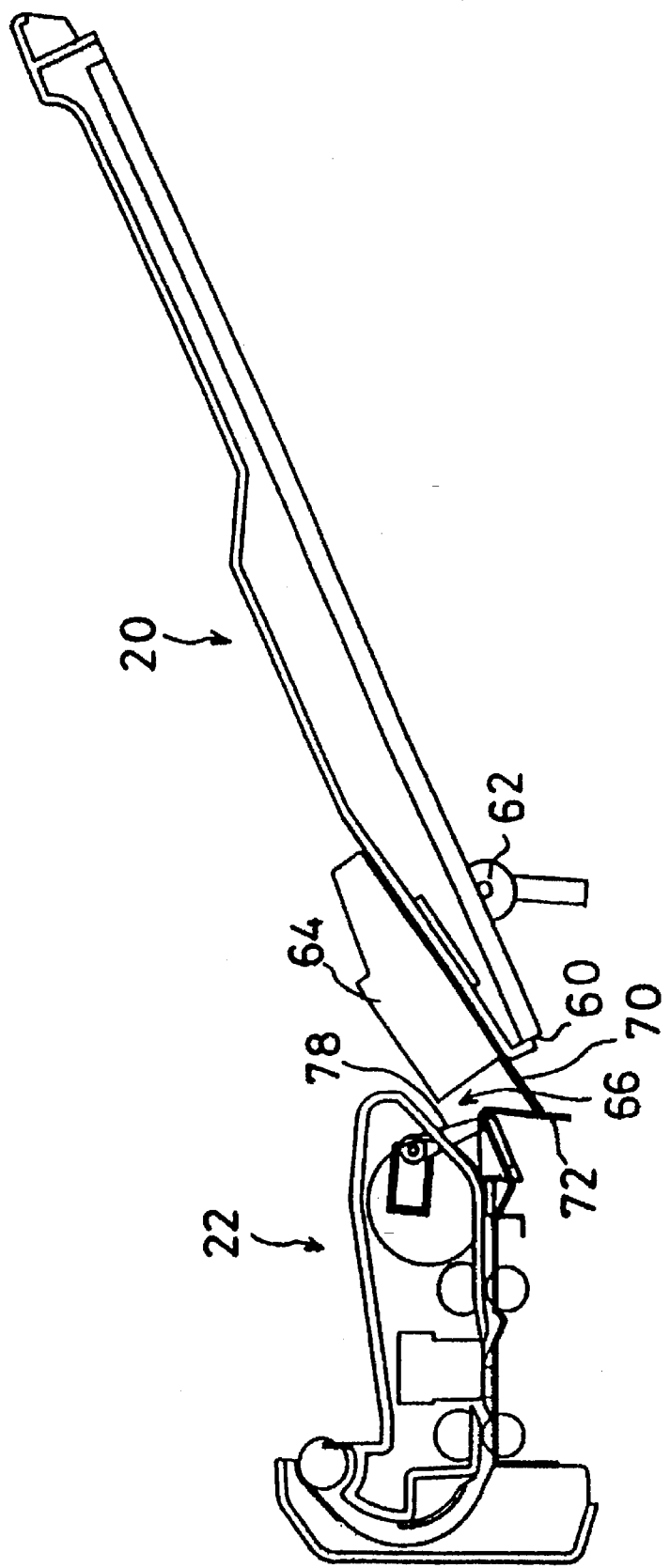
FIG. 7 is an illustrative view showing a state where the platen cover is opened.

Furthermore, since the hinge portion 62 (FIG. 4, FIG. 7) which supports the platen cover 20 is provide at a position separated from the edge 60 of the platen cover 20 with the predetermined distance, when the platen cover 20 is opened, as shown in FIG. 7, for example, a step-wise portion is formed between the upper surface of the platen cover 20 and the entrance 66 of the facsimile original reading portion 22, and therefore, the facsimile original 70 put on the platen cover 20 abuts to the original abutting portion 72. Therefore, the original 70 is not guided to the facsimile original reading portion 22 undesirably, and therefore, there occurs no problem that the apparatus is undesirably changed into the facsimile mode.

Figure 8:
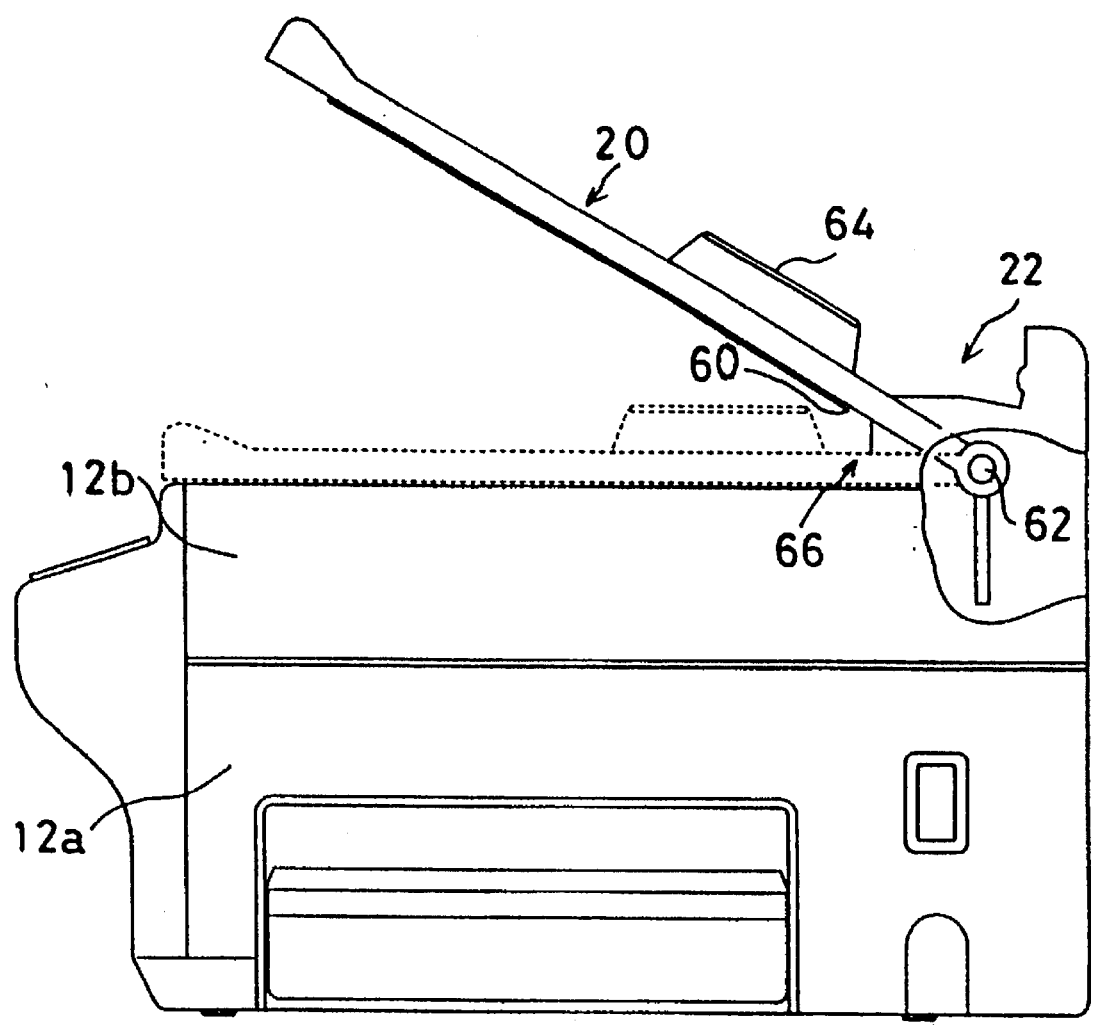
FIG. 8 is an illustrative view shoving another embodiment according to the present invention.

In addition, in the above described embodiment, the hinge portion 82 is provided at a center of the upper housing portion 12b rather than the edge 60 of the platen cover 20; however, the hinge portion 62 may be provided at a side peripheral edge of the upper housing portion 12b rather than the platen cover 20, as shown in FIG. 8, for example. In such a case, since the original put on the platen cover 20 is fallen on the facsimile original reading portion 22, as similar to the previous embodiment, it is possible to prevent the apparatus from being undesirably changed into the facsimile mode.

Furthermore, in the above described embodiment, the original 70 is inhibited from being guided by forming the step-wise portion between the upper surface of the platen cover 20 and the entrance 66 of the facsimile original reading portion 22 when the platen cover 20 is opened (FIG. 7, FIG. 8); however, instead of the step-wise portion, a shutter (not shown) which is closed at a time that the platen cover 20 is opened may be provided in the entrance 66 such that the original 70 is inhibited from being guided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A complex recording apparatus, comprising:
 a housing;
 a platen glass provided at an upper portion of said housing;
 a first original reading means which reads a first original put on said platen glass;
 a platen cover which holds said first original put on said platen glass; and
 a second original reading means which is provided above said housing independently of said platen cover and reads a second original supplied from outside, wherein said platen cover includes a guide means which guides said second original to said second original reading means and further comprising an inhibiting means which inhibits said second original from being guided to said second original reading means when said platen cover is opened, and wherein said inhibiting means includes a step-wise portion formed between an upper surface of said platen cover and an entrance of said second original reading means such that when the platen cover is opened, said second original abuts said step-wise portion, whereby the second original is inhibited from being guided to said second original reading means.

2. A complex recording apparatus according to claim 1, wherein said first original reading means includes an analog processing means which processes an image signal of said first original in an analog manner.

3. A complex recording apparatus according to claim 1, wherein said second original reading means includes a digital processing means which processes an image signal of said second original in a digital manner.

4. A complex recording apparatus according to claim 1, wherein said housing includes an upper housing portion and a lower housing portion which are connected to each other in such a manner that the upper housing portion and the lower housing portion can be separated from each other, and said platen cover and said second original reading means are provided above said upper housing portion.

5. A complex recording apparatus according to claim 1, further comprising an electric circuit board which is arranged below said second original reading means and holds an electric circuit associated with said second original reading means.

6. A complex recording apparatus comprising:
 a first original reading portion which includes a platen glass arranged at an upper portion of a housing, said first reading portion processing image data read from a first original put on said platen glass in an analog manner;
 a platen cover attached to the upper portion of said housing in an openable/closable manner, said platen cover holding said first original put on said platen glass;
 a second original reading portion provided at the upper portion of said housing independently from said platen cover for processing image data read from a second original in a digital manner, wherein an upper surface of said platen cover is utilized as a document feeding portion for said second original; and an inhibiting means which inhibits said second original from being guided to said second original reading portion when said platen cover is opened, said inhibiting means including a step-wise portion which is formed between an upper surface of said platen cover and an entrance of said second original reading portion, and when the platen cover is opened, said second original abuts said step-wise portion, whereby the second original is inhibited from being guided to said second original reading portion.

7. A complex recording apparatus according to claim 6, wherein said housing includes an upper housing portion and a lower housing portion connected to each other in a manner such that the upper housing portion and the lower housing portion can be separated from each other, and said platen cover and said second original reading portion are provided above said upper housing portion.

8. A complex recording apparatus according to claim 6, further comprising an electric circuit board arranged below said second original reading means and holding an electric circuit associated with said second original reading means.

9. A complex recording apparatus according to claim 6, further comprising an operation panel which is arranged at a front portion of said housing and below an upper surface of said platen glass.

* * * * *